Patented Aug. 30, 1932

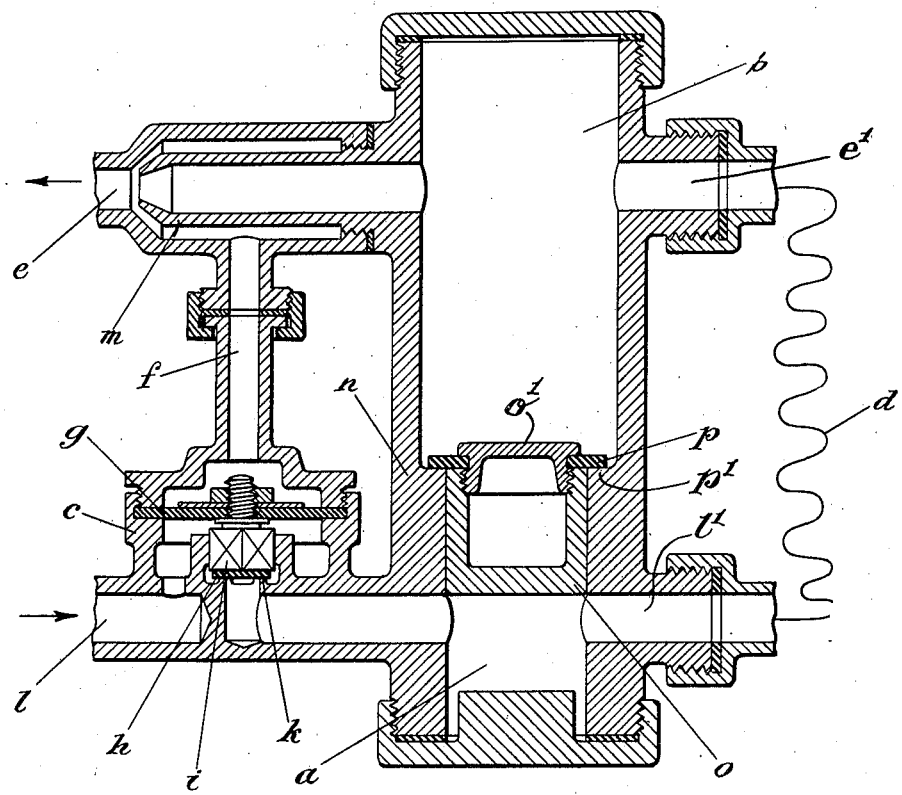

1,874,019

UNITED STATES PATENT OFFICE

FRANCESCO MANGIAMELI, OF DUSSELDORF, GERMANY

SAFETY DEVICE FOR GAS CONDUITS

Application filed March 28, 1930, Serial No. 439,719, and in Germany February 5, 1930.

The invention relates to safety devices for protecting gas lines from back flow and the effect of back fire, such as are liable to occur in mains or pipes supplying gas to cutting or welding torches, of which the oxy-acetylene torch is an example, and the invention involves the application of a diaphragm actuated valve interposed in a supply conduit, normally held open by the predominant pressure in the main and moved by the diaphragm to close position, when the pressure on the delivery side of the valve, due to back flow, predominates, said valve being associated with a piston valve and valve chamber interposed in the line, said valve being held in open position by a frangible support which is ruptured when high pressure, due to back fire, is imposed on the piston valve, causing the latter to close, thereby shutting off the gas supply in the conduit until the piston valve is removed, refitted with a frangible support and replaced in its chamber.

The invention is illustrated in the accompanying drawing, in which the figure is a vertical sectional elevation of the safety device.

In its preferred construction, the device includes a generally cylindrical hollow casting $n$ comprising a lower chamber $a$ and an upper chamber $b$ having open ends closed by suitable screw caps. The said casting is provided near its top with tubular extensions $e$, $e'$ and near its bottom with tubular extensions $l$, $l'$, the extension $l$ being connected to a source of supply of the gas, the extension $e$ being connected to an instrument, such as a blow torch, with which the gas is employed and the extensions $l'$ and $e'$ are connected by a coil or relatively elongated conduit $d$.

Preferably formed as an integral part of the extension $l$ is a valve casing $c$ including a valve seat $k$ with which cooperates a valve disk $h$ secured to the valve body $i$, which, in turn, is carried by a flexible diaphragm $g$ locked into position by the bonnet member of the valve casing, which latter is connected by a tubular conduit member $f$ with the enlarged section of the tubular extension $e$, below an ejector or jet nozzle $m$, which is formed as an integral portion of the tubular extension $e$ and in axial alignment therewith.

Slidably mounted in the lower chamber $a$ of the casing is a piston valve $o$, which is normally held out of registry with the tubular conduit members $l$ and $l'$ by means of a frangible washer $p$, which is secured to the top of the valve by a screw plug $o'$, said washer normally resting upon a shoulder $p'$ formed on the interior wall of the cylindrical casting $n$.

As thus constituted, the safety device constitutes a return bend in a gas conduit between the source of supply, which is connected to the tubular extension $l$, and the apparatus to which the gas is delivered, which is connected to the tubular extension $e$. In the normal operation of the apparatus, the pressure of the gas, entering the tubular extension $l$, causes the diaphragm $g$ to lift the valve from its seat $k$ permitting the gas to flow freely through the extension $l$, chamber $a$, extension $l'$, coil or conduit $d$, extension $e'$, chamber $b$, jet nozzle $m$, tubular extension $e$ to the torch or other device with which the gas is employed. The effect of the gas pressure passing through the jet nozzle $m$ will be to reduce the pressure or cause a partial vacuum in the enlarged portion of the tubular extension $e$ surrounding the jet nozzle, which reduced pressure is transmitted to the upper side of the diaphragm $g$, so that the latter will be maintained in its elevated position to keep the valve disk $k$ off of its seat, so long as the gas pressure in the tubular extension $l$ predominates over that in the upper part of the valve casing above the diaphragm. When the device is employed in the supply main delivering gas, such for example as acetylene, to one or more blow torches, which latter are also supplied with another gas, such as oxygen, from a separate source, if the pressure of the oxygen exceeds that of the acetylene, a back flow of the oxygen is liable to occur, thereby producing an explosive mixture with the acetylene in the tank or reservoir supplying the acetylene. One object of the instant invention is to prevent this back flow, which result is effected by the excess pressure due to the back flow operating on the diaphragm $g$ to overbalance the pressure in the conduit $l$ and to close the valve carried by the diaphragm, the predominant back pressure being transmitted to the top of the diaphragm by the connecting conduit $f$ interposed between the tubular extension $e$ and the top of the valve casing above the diaphragm. When once closed, the valve $i$ will remain in this position so long as the back pressure maintains, but, as soon as such back pressure is relieved and the gaseous mixture is drawn out of the tubular member $e$ by the operation of the blow torch, the pressure in the upper part of the valve casing will again be reduced below the supply pressure of the gas in the conduit member $l$ and the valve will be opened again. As is well known, it is not unusual for blow torches and like devices employing a mixture of gases, which is normally explosive, to back fire with the resultant danger of causing explosion of the gases in the tanks or reservoirs supplying such torches or like devices. To prevent the effect of the back fire or explosion reaching the source of supply of gas to the device, the other safety element of the apparatus is provided, that is to say, the piston valve $o$, which, as stated, is normally supported in inoperative position by the frangible ring $p$. When the excessive pressure developed by the back fire or explosion reaches the chamber $b$, it is imposed directly upon the top of the piston valve and ruptures the frangible ring $p$, so that the piston valve is forced downward into the lower portion of the chamber $a$ closing the openings from the tubular sections $l$ and $l'$ into said chamber, thereby stopping the flow of gas from the conduit $l$ and also stopping the advance of the products of the explosion or back fire. As the speed of travel of the products of the back fire or explosion is high, there is danger of such products reaching the source of supply of the gas to the conduit $l$ before the piston valve can close and, in order to avoid this contingency, the conduit connecting the tubular extension $l'$ and $e'$ is made of considerable length and preferably in coil or helical form to retard the progress of the products of the back fire or explosion, thereby affording ample time for the piston valve $o$ to close.

What I claim is:

1. A safety device for gas lines, comprising a conduit having adjacent sections, a diaphragm operated valve in one section for controlling the flow in said conduit, an ejector nozzle in the adjacent section, and a tubular connection between the diaphragm valve and the adjacent section near said nozzle; whereby reduction of pressure by the nozzle will maintain the valve open, and back pressure in the conduit adjacent the nozzle will operate the diaphragm to close the valve.

2. A safety device for gas lines, comprising a conduit having a return bend with adjacent sections, a valve casing in one section, an ejector nozzle in the adjacent section, a diaphragm in said casing, a valve carried by said diaphragm controlling the flow in said conduit and normally held open by the line pressure on the valve seat of the diaphragm, and a tubular connection between the valve casing on the opposite side of the diaphragm and the conduit section adjacent the ejector nozzle.

3. A safety device for gas lines, comprising a conduit having adjacent sections, a diaphragm operated valve in one section effective to stop the flow of gas when back pressure occurs in the other section, a casing connecting the adjacent sections, a piston valve in the lower part of said casing to prevent flow in either direction through said casing, and frangible means for retaining the piston valve in open relation but rupturable under excess pressure to release the valve.

4. A safety device for gas lines, comprising a casing having inlet and outlet connections near both the top and bottom thereof and adapted to be interposed in adjacent sections of a return bend conduit, a piston valve in said casing adapted to stop the flow in one section of said conduit, and a frangible means for supporting said valve in inoperative relation in said casing, said means being rupturable under excessive pressure to release the valve.

5. A safety device for gas lines, comprising a casing having inlet and outlet connections near both the top and bottom thereof, and a shoulder on its inner wall intermediate its length, a piston valve slidable in the lower part of said casing to open and close the lower inlet and outlet connections, and a frangible ring fixed to the piston and engaging the shoulder in the casing to hold the piston in inoperative position, said ring being rupturable under excess pressure to release the valve.

FRANCESCO MANGIAMELI.